Oct. 12, 1965     H. B. FORSLUND ETAL     3,211,577
PROCESS FOR COATING FERROUS MATERIAL WITH MAGNESIUM OXIDE
Filed Oct. 23, 1962

Inventors,
Herbert B. Forslund,
Walter G. Hoehn,
by Francis X. Doyle
Their Attorney.

3,211,577
PROCESS FOR COATING FERROUS MATERIAL
WITH MAGNESIUM OXIDE
Herbert B. Forslund, Williamstown, Mass., and Walter G. Hoehn, Broomwall, Pa., assignors to General Electric Company, a corporation of New York
Filed Oct. 23, 1962, Ser. No. 232,621
4 Claims. (Cl. 117—127)

This invention relates to coatings for ferrous material and, more particularly, to a process for coating ferrous material.

In many fields of use and, in particular, in the electrical industry, it is necessary to provide a coating on ferrous material. This coating desirably performs the functions of insulating, separating and purifying the ferrous material as discussed below. For example, in the transformer art, the cores of the transformers are usually formed of a ferrous material, such as, for example, silicon steel, which may be provided with a preferred grain growth orientation to provide optimum electrical and magnetic properties. It has been found necessary to provide a coating on each of the various layers of ferrous material in the core. This coating will perform three separate functions. The first function of the coating is to provide separation of the various turns or layers of the material, for example, when used in cores, to prevent their sticking or welding together during high temperature anneals. A second function is that of aiding in the chemical purification of the ferrous material to develop the desired optimum magnetic characteristics of such material. The third function of the coating is to form on the surface of the ferrous material an insulation which will have sufficient electrical strength to provide for the electrical insulation of one layer of ferrous material from the next, for example, during its use as a core in a transformer.

In the present state of the electrical apparatus art, the most widely used coating for the ferrous material which is used as the magnetic core of the electrical apparatus is a coating of magnesium oxide and/or magnesium hydroxide. These coatings are in general, applied to the ferrous material in the form of a suspension of magnesium hydroxide in water. The suspension comprises a quantity of magnesium oxide in water and is mixed sufficiently for the desired application, the magnesium oxide being hydrated to an extent dependent on the character of the oxide used. The term "magnesium hydroxide slurry" as used throughout the remainder of this specification will mean a suspension of magnesium hydroxide in water, which may include magnesium oxide which has not been hydrated. Further, the term "magnesium hydroxide coating" will mean a coating of magnesium hydroxide which may include unhydrated magnesium oxide.

As noted, the coating which is generally applied to ferrous material in the present state of the art is a coating of magnesium hydroxide which is applied in the form of a water slurry. The coating is then dried to leave a thin layer of coating material on the surface of the ferrous material. In the present state of the art it is not, in general, possible to provide a satisfactory coating on the surface of a ferrous material using a substantially pure magnesium hydroxide slurry. The substantially pure magnesium hydroxide slurry will not form a sufficiently adherent layer of coating material of proper thickness on the ferrous material to withstand the subsequent handling and bending of the coated ferrous material, for example, the bending necessary in the formation of a magnetic core. The coating, under such circumstances, has a great tendency to flake and drop off thus creating excessive dust during the formation of the core with its resulting problems to equipment and to the health of the workmen. Of course, such flaking also results in inferior interlaminar insulation after annealing.

A number of additives have been proposed to be added to the magnesium hydroxide slurry which would help the magnesium hydroxide to adhere to the surface of the ferrous material. However, it has been found that many of these additives create other problems. For example, many of these additives introduce additional carbon or other contaminants to the steel, thereby causing either higher initial losses or higher aging losses, or both such additional losses, when such material is used in magnetic cores for electrical magnetic apparatus. From the above it is obvious that there is a great need in the electrical industry for a coating material which will form a tenacious, adherent coating on ferrous material, such as silicon steel, while at the same time not detracting from the optimum magnetic characteristics of such silicon steel.

In co-pending applications Serial No. 99,558; now Patent No. 3,073,722 filed March 30, 1961, for Process for Coating Ferrous Material and Material Coated by Such Process, in the names of H. B. Forslund et al., Serial No. 230,219; filed October 12, 1962 for Process for Coating Ferrous Material and Material Coated by Such Process in the names of H. B. Forslund et al. and Serial No. 232,620; filed October 23, 1962, for Process for Coating Ferrous Material and Material Coated by Such Process, in the names of H. B. Forslund et al., all assigned to the same assignee as this invention, various coating processes are described and claimed for providing a coating of magnesium hydroxide on ferrous material. It has recently been discovered that the various processes described in the above-noted co-pending applications, as well as other well known processes, can be substantially improved as to the adhesion of the coating to the ferrous material by means of a sonic mixer being used in the slurry.

It is, therefore, one object of this invention to provide a process for applying a tenacious coating on ferrous material comprised substantially of magnesium hydroxide, which coating will not detract from the magnetic properties of the ferrous material.

It is a further object of this invention to provide a process for coating ferrous material with a coating comprised substantially of magnesium hydroxide.

A further object of this invention is to provide a process for preparing a magnesium hydroxide slurry in which novel mixing means are used to mix the slurry.

In carrying out this invention in one form, a slurry is prepared comprising a quantity of magnesium oxide and water. The magnesium oxide forms a suspension of magnesium hydroxide in the water. The slurry is then pumped through a sonic mixing device which substantially improves the adhesive qualities of the magnesium hydroxide. The slurry is then coated on a ferrous magnetic material in any desired manner and then dried to remove any excess water. An adherent film comprised substantially of magnesium hydroxide will remain on the surface of the ferrous material.

The features of this invention which are believed to be novel are set forth with particularity in the appended claims. However, it is believed that the invention itself and the manner in which its objects are obtained, as well as other objects and advantages thereof, will be more fully understood by reference to the following detailed description thereof, when read in connection with the accompanying drawing, in which:

Figure 1:
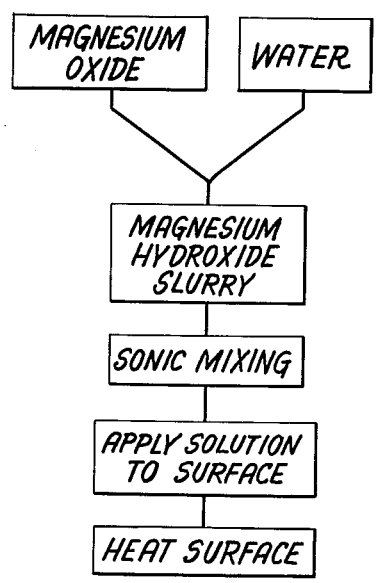
FIGURE 1 is a flow diagram illustrating one form of the process of this invention.

It has been discovered that unexpected, improved results may be obtained in magnesium hydroxide coatings for ferrous magnetic material when the slurry of magnesium hydroxide is subjected to a sonic mixing operation. The suspension resulting from such mixing is not only free from large particles of magnesium hydroxide, but when applied to a ferrous magnetic material has a tendency to tenaciously adhere to such surface. FIGURE 1 shows a flow diagram of one form of the process of this invention. As shown, a quantity of magnesium oxide is mixed with water to form a slurry which is an aqueous suspension of magnesium hydroxide. In the preferred process, a magnesium oxide powder is used, the slurry being approximately 5.5 to 8% by weight of magnesium oxide powder suspended in water. Mixing is accomplished by means of a sonic mixer, which will in general provide for substantially complete hydration of the magnesium oxide. As will be understood, various additives may be added to the magnesium hydroxide slurry in the manner set forth in application Serial No. 99,558 or application Serial No. 232,620, if desired. After the slurry is completely mixed, it may be applied to the surface of a ferrous material in any desired manner, such as for example, by roller coating on the material. This coating may be dried upon the material at a surface temperature not more than approximately 135°C. If the drying is carried out above this temperature, there is a tendency for the coating to break down, leaving a spotty coating rather than the thin, even coat desired. After drying there remains on the surface a thin film of magnesium hydroxide which has an excellent resistance to abrasions and which will permit 90° bending without flaking of the coating thereon.

If a suspension of less than approximately 5.5% by weight of magnesium oxide powder is used to form the slurry, the resultant coating does not provide a sufficient amount of magnesium hydroxide to the ferrous material. When the suspension contains more than approximately 8% by weight of magnesium oxide powder, the slurry becomes too difficult to process in the desired manner.

As is well known to those skilled in the art, magnesium hydroxide slurries exhibit a characteristic viscosity change with time. The viscosity of the slurry first starts to increase and then begins to decrease to a very low value. It is only after the slurry has reached a low viscosity range that it is useful to form magnesium hydroxide coatings. As is well known, where the slurry is of high viscosity it has substantially no tendency to adhere to the surface of a ferrous material. The magnesium hydroxide slurries prepared according to the process of this invention exhibit similar viscosity characteristics. However, slurries prepared according to this invention begin to decrease in viscosity in a much shorter time than conventionally mixed slurries and also decrease to a much lower viscosity than that of conventionally mixed slurries. This is believed due to the fact that by use of the sonic mixing of this invention the hydration of the magnesium oxide is substantially complete in a much shorter time than is possible with other forms of non-sonic mixing. As will be understood, slurries are conventionally mixed by means of large paddles rotating continuously in the slurry. Another form of non-sonic mixing may be termed "pump mixing." In this type of mixing the slurry is continuously drawn into a pump and returned to the main body of the slurry. This provides a continuous circulation of the slurry and provides substantially faster hydration of the magnesium oxide than is possible with conventional paddles. However, even pump mixing does not provide the substantially complete hydration in a reasonable time that is possible with the sonic mixing of this invention. This is graphically shown in FIGURE 2.

Figure 2:
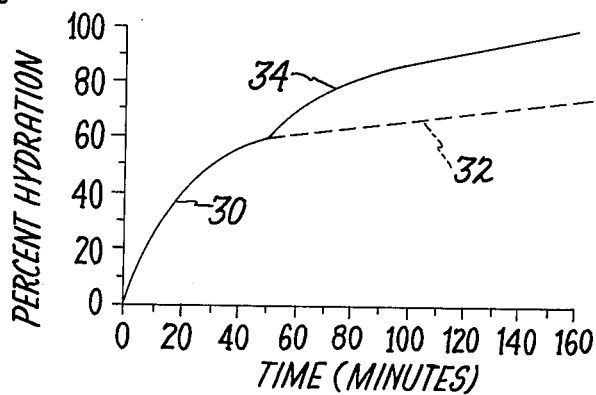
FIGURE 2 is a composite curve showing the percent hydration of magnesium oxide in a slurry using one type of non-sonic mixing and sonic mixing according to this invention.

Referring now to FIGURE 2 of the drawing, there is shown a composite curve providing a comparison of the percent hydration of magnesium oxide powder that is obtained by pump mixing an aqueous suspension of magnesium oxide and then sonic mixing of the same slurry. The aqueous suspension was prepared by placing approximately 8% by weight of magnesium oxide powder in water. The suspension was mixed by circulation through a pump, as hereinbefore discussed, for approximately 50 minutes. The percent hydration of the magnesium oxide powder was determined at approximate ten minute intervals by means of X-ray diffraction. The results are shown by the portion of the curve designated 30 in FIGURE 2. As can be seen from portion 30, the magnesium oxide powder is rapidly hydrated to approximately 50% in the first 25 minutes. The rate of hydration then slows appreciably such that there is only 60% hydration of the powder after 50 minutes of mixing. The dotted portion of the curve, labeled 32, shows that the hydration continues to increase very slowly. For example, at the end of 150 minutes of mixing by pump circulation, the hydration would only have increased to slightly more than 70%. It will also be apparent that for longer periods of mixing by pump circulation, the hydration will continue to increase at a very slow rate.

However, if the slurry is subjected to sonic mixing, the hydration will continue to increase at a fairly rapid rate until substantially complete hydration of the magnesium oxide powder is obtained. This is shown by portion 34 of the composite curve of FIGURE 2. In this instance, after 50 minutes of pump circulation, the slurry was subjected to sonic mixing. The precent hydration was determined periodically by means of X-ray diffraction. As can be seen from curve portion 34, after approximately 20 minutes of sonic mixing the percent hydration had increased from 60% to approximately 80% hydration of the magnesium powder. After 50 minutes the powder was approximately 90% hydrated and after 100 minutes the hydration was substantially completed. That is, after approximately 100 minutes of sonic mixing the hydration of the magnesium oxide powder increased from 60% to substantially 100% hydration. It is believed that the substantially complete hydration of the magnesium oxide powder which occurs when using the sonic mixing of this invention contributes to the very low viscosity of the sonically mixed slurries which in turn provides the unexpected adherent magnesium hydroxide coating.

In the process of this invention the sonic mixing may be provided in any desired manner. As used herein the term "sonic mixing" means mixing in which the slurry is subjected to vibrations within the sonic frequency range. The exact frequency used will in general be determined by the type of mixing or vibrating equipment used. When using the type of mixing equipment shown in FIGURE 3, to be more fully described hereafter, it has been found that the best results are obtained when the blade of the mixer vibrates at a frequency in the vicinity of 1,000 cycles per second.

Figure 3:
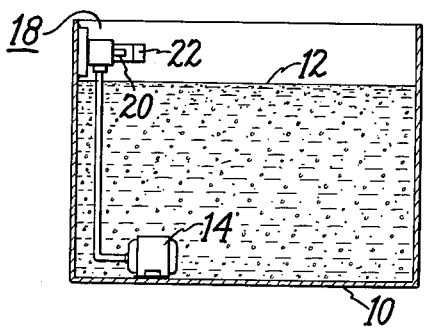
FIGURE 3 is a schematic drawing of one form of a tank and mixing assembly which may be used in the process of this invention.

One method of generating the sonic frequency used in this invention is shown in FIG. 3 of the drawing. As shown in FIG. 3, a large tank 10 is provided. The desired quantities of magnesium oxide and water are placed in the tank 10, generally to the level indicated at 12. A pump 14 is provided in tank 10, and by means of conduit 16 the suspension of the partially hydrated magnesium oxide is pumped to a sonic mixing device 18. In the preferred process the sonic mixer 18 comprises a jet nozzle 20 and a blade member 22. The pumped slurry is forced through the nozzle 20 and impinges directly on the edge of the blade 22. This causes blade 22 to vibrate at its natural frequency and thus sonically mixes the slurry.

When the sonically mixed slurry is coated on a ferrous magnetic material it provides an unexpectedly tenacious, adherent coating of magnesium hydroxide. For example, when a conventionally mixed slurry of the type set forth in the above example was roller coated on the surface of a strip of silicon steel, the coating completely rubbed off. However, when the sonically mixed slurry of the above example was roller coated on a similar strip of silicon steel material it formed a tenacious, adherent coating. The coating was very resistant to abrasion and did not flake when subjected to 90° bending.

From the above it will be apparent that by means of the process of this invention a tenacious, adherent coating of magnesium hydroxide may be applied to ferrous magnetic material. While this invention has been disclosed with reference to particular embodiments of the process it will be understood that various changes may be made by those skilled in this art without departing from the spirit and scope of the invention as defined in the appended claims.

What is claimed as new and which it is desired to secure by Letters Patent of the United States is:

1. A process for forming an adherent coating on the surface of a ferrous material comprising the steps of forming a suspension of approximately 5.5 to 8% by weight of magnesium oxide in water, sonically mixing said suspension, applying said sonically mixed suspension to the surface of the ferrous material, and drying said suspension on the surface at a temperature not in excess of approximately 135° C.

2. A process for forming an adherent coating on the surface of a ferrous magnetic material comprising the steps of forming an aqueous suspension of magnesium oxide, sonically mixing said suspension until said suspension attains a low viscosity and further mixing does not lower said low viscosity, applying said low viscosity suspension to the surface of the ferrous material and heating the surface to approximately 135° C. to dry said suspension.

3. A process for forming an adherent coating on the surface of a ferrous material comprising the steps of forming a slurry of approximately 5.5 to 8% by weight of magnesium oxide and water, sonically mixing said slurry until said slurry has a low viscosity and further mixing does not lower said low viscosity, applying said low viscosity slurry to the surface of the ferrous material, and drying said slurry on the surface at a temperature not in excess of approximately 135° C.

4. A process for forming an adherent coating on the surface of a ferrous material as set forth in claim 3 in which the frequency of sonic mixing is approximately 1,000 c.p.s.

References Cited by the Examiner

UNITED STATES PATENTS

| | | |
|---|---|---|
| 2,637,535 | 5/53 | Arnold. |
| 2,657,021 | 10/53 | Cottell et al. _____ 259—1 |
| 2,713,998 | 7/55 | Eicken _____ 259—95 |
| 2,909,454 | 10/59 | Neish _____ 117—127 X |
| 3,073,722 | 1/63 | Hoehn et al. _____ 117—127 |
| 3,084,081 | 4/63 | Carpenter _____ 148—113 X |

FOREIGN PATENTS 643,537   6/62   Canada.

OTHER REFERENCES

Ginberg et al.: Zhur Priklad Khim. 33, pp. 1729–33 (1960) (CA 54: 25384i).

RICHARD D. NEVIUS, *Primary Examiner.*

WILLIAM D. MARTIN, *Examiner.*